(12) United States Patent
Tosey

(10) Patent No.: US 7,836,131 B2
(45) Date of Patent: Nov. 16, 2010

(54) REDIRECTION OF NOTIFICATIONS TO A WIRELESS USER DEVICE

(75) Inventor: Joseph Peter Robert Tosey, N. Vancouver (CA)

(73) Assignee: Sierra Wireless, Inc., Richmond, BC (CA)

( * ) Notice: Subject to any disclaimer, the term of this patent is extended or adjusted under 35 U.S.C. 154(b) by 777 days.

(21) Appl. No.: 10/280,878

(22) Filed: Oct. 25, 2002

(65) Prior Publication Data

US 2004/0083271 A1 Apr. 29, 2004

(51) Int. Cl.
*G06F 15/16* (2006.01)

(52) U.S. Cl. ............... 709/206; 709/224; 455/412.2

(58) Field of Classification Search ............ 709/206, 709/225, 207, 224; 713/154; 455/412, 412.2
See application file for complete search history.

(56) References Cited

U.S. PATENT DOCUMENTS

| | | | |
|---|---|---|---|
| 6,219,694 B1 | 4/2001 | Lazaridis et al. | |
| 6,411,684 B1 | 6/2002 | Cohn et al. | |
| 6,609,196 B1* | 8/2003 | Dickinson et al. | ............ 713/154 |
| 6,825,947 B1 | 11/2004 | Asai | |
| 7,103,656 B2 | 9/2006 | Lewis et al. | |
| 7,124,413 B1 | 10/2006 | Klemm et al. | |
| 7,243,163 B1 | 7/2007 | Friend et al. | |
| 7,672,998 B1 | 3/2010 | Haskins et al. | |
| 2002/0049818 A1* | 4/2002 | Gilhuly et al. | ............ 709/206 |
| 2002/0107925 A1* | 8/2002 | Goldschneider et al. | .... 709/206 |
| 2002/0128036 A1 | 9/2002 | Yach et al. | |
| 2002/0143866 A1 | 10/2002 | Lewis et al. | |
| 2002/0194285 A1* | 12/2002 | Mousseau et al. | ........... 709/206 |
| 2003/0050046 A1* | 3/2003 | Conneely et al. | ............ 455/412 |
| 2003/0055902 A1 | 3/2003 | Amir et al. | |
| 2003/0088628 A1* | 5/2003 | Lin | ............ 709/206 |
| 2003/0135618 A1* | 7/2003 | Pisupati | ............ 709/225 |

FOREIGN PATENT DOCUMENTS

| | | |
|---|---|---|
| EP | 1 014 629 | 11/1999 |
| WO | 00/31931 | 6/2000 |
| WO | 02/25890 | 3/2002 |

OTHER PUBLICATIONS

J. Myers, et al., "*Post Office Protocol*", ver. 3, Network Working Group, May 1996, pp. 1-16.

M. Crispin, "*Internet Message Access Protocol*", ver. 4, Network Working Group, Dec. 1996, pp. 1-82.

(Continued)

*Primary Examiner*—Jungwon Chang
(74) *Attorney, Agent, or Firm*—Nixon Peabody LLP

(57) ABSTRACT

Redirecting a notification to a wireless user device includes registering for notification of incoming messages for an account on a message server, the incoming messages being directed to an account on the message server. The redirecting also includes receiving at least one notification and redirecting the at least one notification through a firewall to a wireless user device associated with the account. The remote message server is in communication with a network protected by the firewall. According to one aspect, a cradle is configured to perform the redirection. According to another aspect, the cradle is associated with a remote desktop computer in communication with the network.

58 Claims, 5 Drawing Sheets

OTHER PUBLICATIONS

SyncML, "*SyncML Sync Protocol*", ver. 1.1, Feb. 15, 2002, pp. 1-62.
International Search Report, PCT/US 03/01611, International filing date Oct. 23, 2003, date Search Report mailed Feb. 27, 2004.
Office Action in U.S. Appl. No. 11/977,967, mailed Apr. 27, 2010.
Office Action for U.S. Appl. No. 11/977,967, mailed Feb. 11, 2009.
Office Action for U.S. Appl. No. 11/977,967, mailed Nov. 20, 2009.

* cited by examiner

REDIRECTION OF NOTIFICATIONS TO A WIRELESS USER DEVICE

FIELD OF THE INVENTION

The present invention relates to the field of computer science. More particularly, the present invention relates to a method and apparatus for redirecting notifications to a wireless user device.

BACKGROUND OF THE INVENTION

Users of personal digital assistants (PDAs) often desire to have their email messages or other notifications forwarded from their corporate email account to their PDA. FIGS. 1A and 1B illustrate two typical mechanisms for redirecting notifications to a PDA. Both solutions include a "redirector" application that resides behind a corporate firewall and pushes email messages from an email server to a wireless user device. Examples of commercially available redirector applications include Symmetry Pro™, available from Infowave Corporation of Burnaby, British Columbia and BlackBerry™, available from Research in Motion (RIM) of Waterloo, Ontario.

Referring to FIG. 1A, a user's desktop computer 125 is in communication with an email server or exchange server 100 via a corporate network such as a virtual private network (VPN) 110. Desktop computer 125 is also in communication with a cradle 130. Email server 100 includes a redirector application 105 that is configured to forward notifications directed to a user's desktop computer 125 to the user's PDA 120 through firewall 115 and via remote email directory 185.

Unfortunately, this solution typically requires the assistance of a corporation's information technology (IT) manager to install the redirector application in the corporate network. Oftentimes, the IT manager may not be able to justify the configuration effort and the expense required to implement the solution.

Another solution places a redirector application on a user's desktop computer. This is illustrated in FIG. 1B. As shown in FIG. 1B, a user's desktop computer 170 is in communication with an email server or exchange server 155 via a corporate network such as a virtual private network (VPN) 160. Desktop computer 170 is also in communication with a cradle 175. Desktop computer 170 includes a redirector application 180 that is configured to log into email server 155 and forward notifications directed to a user's desktop computer 170 to the user's PDA 150 through firewall 165 and via remote email server 190.

Unfortunately, mobile professionals typically use a laptop or mobile computer as their desktop computer and they typically take their computers with them when traveling, leaving nothing behind the corporate firewall to forward notifications to a PDA.

Accordingly, a need exists in the prior art for mechanism that allows notifications to be forwarded from a corporate network to a users' wireless user device that does not require reconfiguring an email server or a user's desktop computer. A further need exists for such a solution that allows a wireless user device such as a PDA to transparently connect to a corporate network, without visibility by a VPN. Yet another need exists for such a solution that is relatively simple to configure and maintain.

SUMMARY OF THE INVENTION

Redirecting a notification to a wireless user device includes registering for notification of incoming messages for an account on a message server, the incoming messages being directed to an account on the message server. The redirecting also includes receiving at least one notification and redirecting the at least one notification through a firewall to a wireless user device associated with the account. The remote message server is in communication with a network protected by the firewall. According to one aspect, a cradle is configured to perform the redirection. According to another aspect, the cradle is associated with a remote desktop computer in communication with the network.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1A:
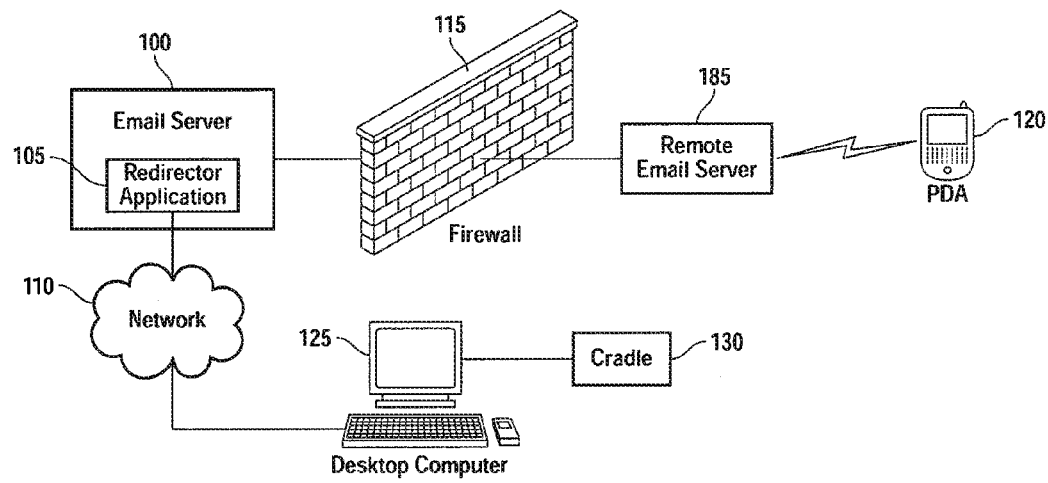
FIG. 1A is a block diagram that illustrates a typical mechanism for redirecting notifications to a personal digital assistant (PDA) using a redirector application installed on an email server.
Figure 1B:
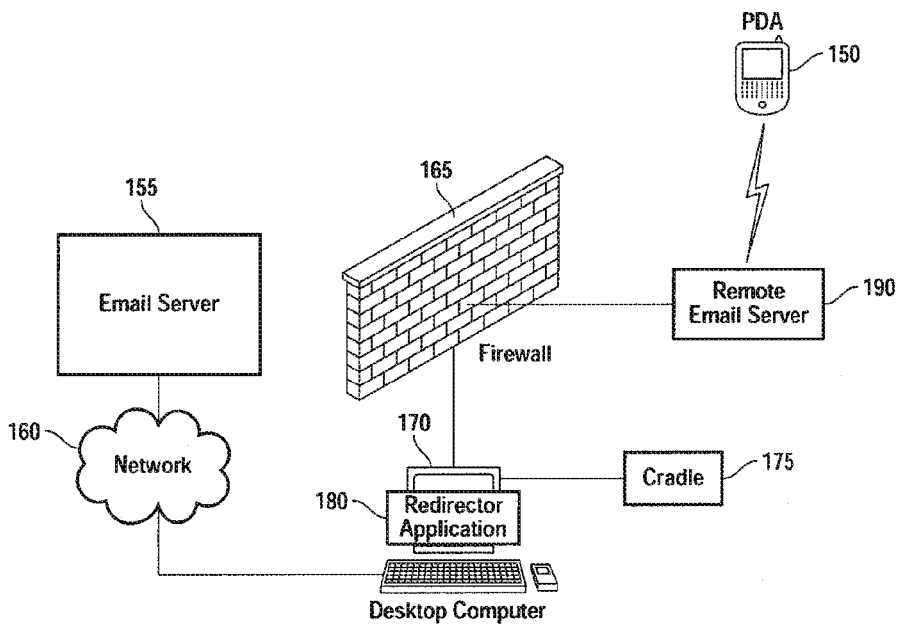
FIG. 1B is a block diagram that illustrates a typical mechanism for redirecting notifications to a personal digital assistant (PDA) using a redirector application installed on a desktop computer.

Embodiments of the present invention are described herein in the context of a method and apparatus redirecting notifications to a wireless user device. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices' of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "wireless user device" includes any device capable of wireless communication and capable of rendering information to a user. The information may be rendered, by way of example, by visual, auditory or tactile means. Exemplary wireless user devices include, by way of example, a personal digital assistant (PDA), a mobile phone, a personal computer, a pager, or the like.

MAPI (Messaging Application Programming Interface) is a messaging architecture and a client interface component for applications such as electronic mail, scheduling, calendaring and document management. MAPI is available on many Windows client operating systems, beginning with Windows 95. MAPI is also available on Windows® CE client operating systems dating back to 3.0. Windows® 95 and Windows® CE 3.0 are available from Microsoft Corporation of Redmond, Wash.

The IMAP4 (Internet Message Application Protocol—version 4) protocol is described in Request for Comments (RFC) 2060, December 1996. Exemplary email servers that support IMAP4 include Lotus Notes®, available from IBM Lotus Software of Cambridge, Mass., Microsoft® Exchange, available from Microsoft Corporation of Redmond, Wash. and Groupwise®, available from Novell of Provo, Utah.

In the context of the present invention, the term "message monitoring protocol" refers to a communication protocol capable of retrieving a message from an email server. Exemplary message monitoring protocols include, by way of example, MAPI, IMAP4, POP3 (Post Office Protocol—Version 3), ActiveSync® and SyncML. The POP3 protocol is described in "Post Office Protocol—Version 3", RFC 1939, Network Working Group, May 1996, available at www.ietf.org. ActiveSync® is available from Microsoft Corporation of Redmond, Wash. The SyncML protocol is described in "SyncML Synch Protocol, version 1.1", Feb. 15, 2002, available at www.synchml.org.

In the context of the present invention, the term "message distribution protocol refers to a communication protocol capable of delivering a message to a wireless user device. Exemplary message distribution protocols include, by way of example, MAPI, IMAP4, POP3, ActiveSync®, Wireless ActiveSync and SynchML. Wireless ActiveSync® is available from Microsoft Corporation of Redmond, Wash. A message distribution protocol may also comprise a protocol that uses another protocol as a transport protocol. By way of example, a message distribution protocol may use Hypertext Transport Protocol (HTTP), Short Message Service (SMS), or the like, as a transport protocol.

Figure 2:
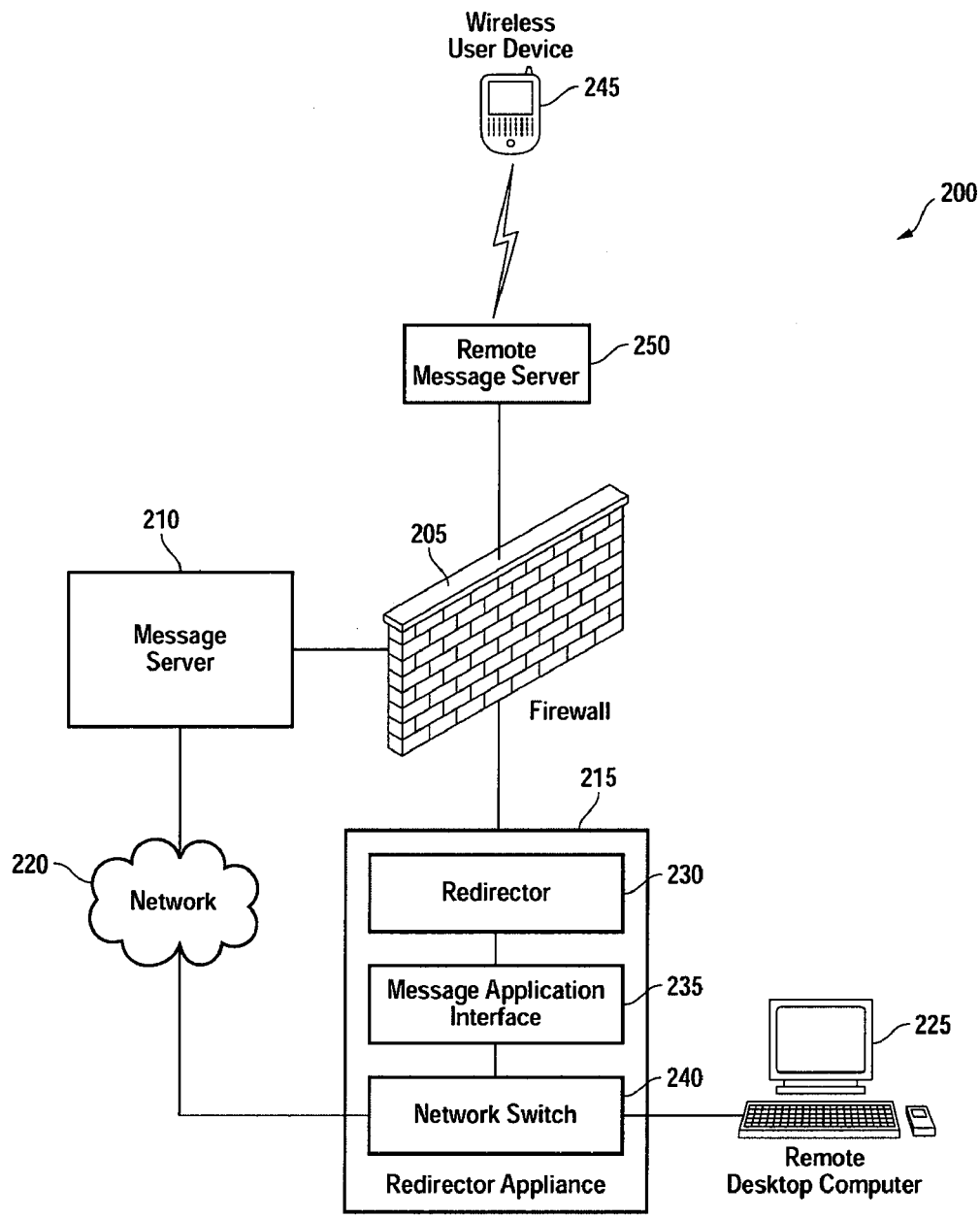
FIG. 2 is a block diagram that illustrates a system for redirecting notifications to a wireless user device using a redirector appliance in accordance with one embodiment of the present invention.
Figure 3:
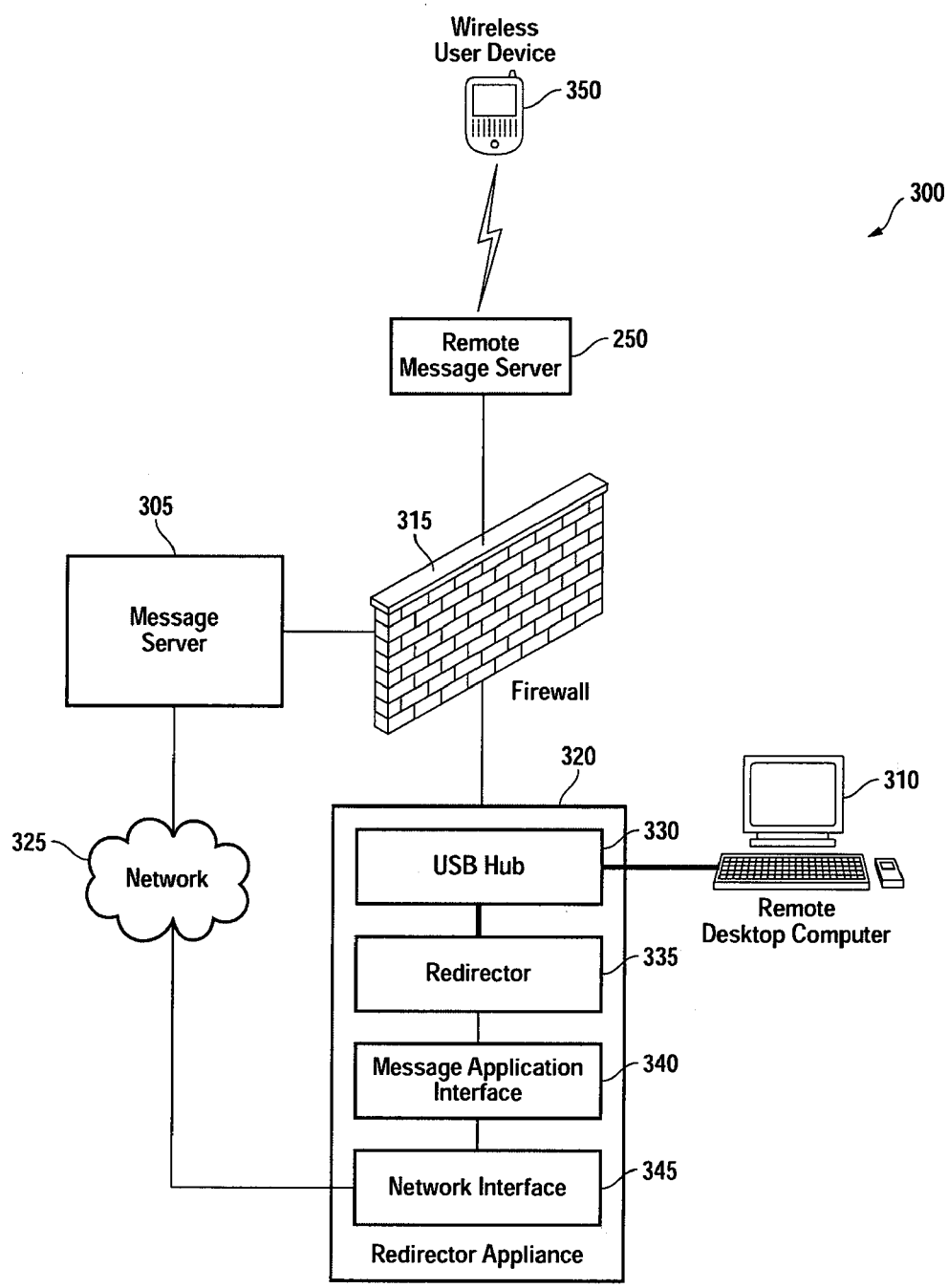
FIG. 3 is a block diagram that illustrates a system for redirecting notifications to a wireless user device using a redirector appliance in accordance with one embodiment of the present invention.

FIGS. 2 and 3 illustrate systems for redirecting notifications to a wireless user device using a redirector appliance in accordance with embodiments of the present invention. The redirector appliance includes a redirector that redirects notifications such as an email message or an indication of an email message to a wireless user device associated with an email account, regardless of whether a remote desktop computer is in communication with the redirector. FIG. 2 illustrates a redirector appliance that uses a network to communicate with a remote desktop computer, whereas FIG. 3 illustrates a redirector appliance that uses a universal serial bus (USB) to communicate with a remote desktop computer.

Turning now to FIG. 2, a block diagram that illustrates a system for redirecting notifications to a wireless user device using a redirector appliance in accordance with one embodiment of the present invention is presented. System 200 comprises a redirector appliance 215, a wireless user device 245, an email server 210, a remote email server 250 and optionally a remote desktop computer 225. Redirector appliance 215 comprises a network switch 240, a message application interface 235 and a redirector 230. Redirector appliance 215 may also comprise a means for receiving a wireless user device such as a PDA or the like. Network switch 240 is configured to interface between a network such as a virtual private network (VPN) 220 or the like, message application interface 235 and remote desktop computer 225. Network switch 240 allows both remote desktop computer 225 and redirector appliance 215 to communicate with network 220, without requiring an additional network jack on the users' office wall.

Many other devices or subsystems (not shown) may be connected in a similar manner. Also, it is not necessary for all of the devices shown in FIG. 2 to be present to practice the present invention. By way of example, remote desktop computer 225 is not required to practice the present invention. Furthermore, the devices and subsystems may be interconnected in different ways from that shown in FIG. 2.

According to one embodiment of the present invention, redirector appliance 215 comprises an embedded computer that operates under a message monitoring protocol-enabled operating system. Additionally, message application interface 235 comprises a module that implements the message monitoring protocol and redirector 230 is configured to register for notifications of email messages incoming to an email account on an exchange server 210 and redirect received notifications from email server 210 to wireless user device 245 through firewall 205.

In operation, redirector 230 registers for notifications to remote desktop computer 225 with exchange server 210. Redirector 210 redirects notifications directed to remote desktop computer 225 to wireless user device 245.

According to one embodiment of the present invention, a notification to wireless user device 350 comprises the actual email message. The notification contents may be encrypted. Additionally, SMS may be used as a transport protocol to deliver the email message notification to the wireless user device 350. Those of ordinary skill in the art will recognize that other transport protocols may be used as well.

According to another embodiment of the present invention, a notification to wireless user device 350 comprises an indication to the user that new mail has arrived. The user may then use the wireless user device 350 to log in to an email server 305 using a secure protocol such as SSL (Secure Socket Layer) or the like, and receive the email message.

According to another embodiment of the present invention, message application interface 235 comprises a module that implements a message distribution protocol and redirector 230 is configured to log in to remote email server 210, periodically poll remote message server 210 for new notifications directed to remote desktop computer 225 and redirect the notifications to wireless user device 245 through firewall 205. In operation, redirector 230 logs in to remote message server 210 and periodically checks for new notifications. Redirector 230 redirects the notifications to wireless user device 245.

Turning now to FIG. 3, a block diagram that illustrates a system for redirecting notifications to a wireless user device using a redirector appliance in accordance with one embodiment of the present invention is presented. FIG. 3 is similar to FIG. 2 except that remote desktop computer 310, if present, communicates with redirector appliance 320 via a universal serial bus (USB) interface. According to one embodiment of the present invention, the remote desktop computer is the master 310 on the USB and the redirector appliance 320 is the slave.

Many other devices or subsystems (not shown) may be connected in a similar manner. Also, it is not necessary for all of the devices shown in FIG. 3 to be present to practice the present invention. By way of example, remote desktop computer 310 is not required to practice the present invention. Furthermore, the devices and subsystems may be interconnected in different ways from that shown in FIG. 3.

According to another embodiment of the present invention, the wireless user device (reference numeral 245 of FIG. 2 and reference numeral 350 of FIG. 3) comprises a PDA and the redirector appliance (reference numeral 230 of FIG. 2 and reference numeral 335 of FIG. 3) comprises a smart PDA cradle.

Figure 4:
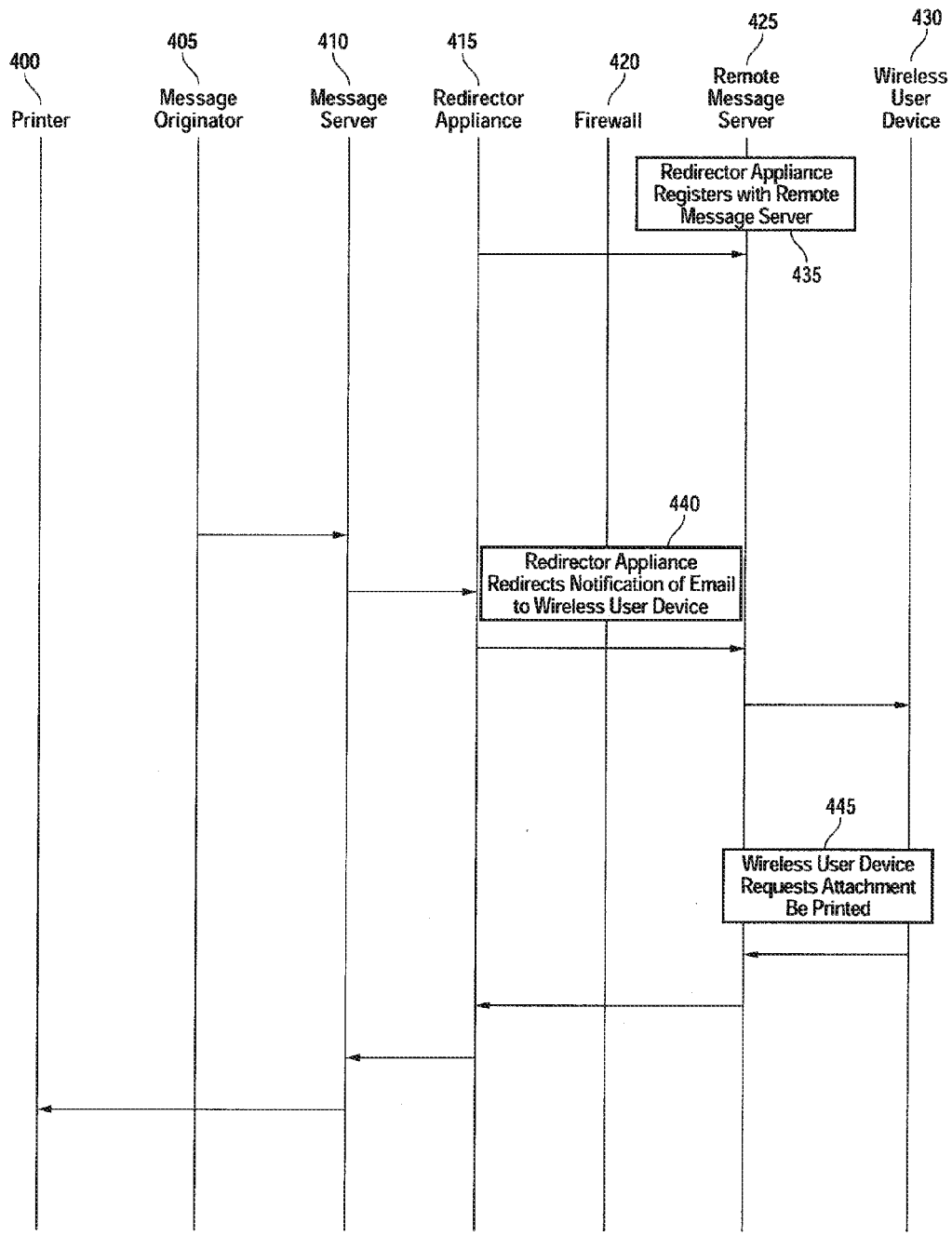
FIG. 4 is an event sequence diagram that illustrates operation of a redirector appliance in accordance with one embodiment of the present invention.

Turning now to FIG. 4, an event sequence diagram that illustrates operation of a redirector appliance in accordance with one embodiment of the present invention is presented. FIG. 4 illustrates registering for notification of messages such as email messages directed to an email account on an email server, redirecting a notification to a wireless user device 430 and redirecting requests from the wireless user device 430. At 435, redirector appliance 415 registers with a remote message server 425. Remote message server 425 communicates the registration request to message server 410. Upon receiving a message from a message originator 405 directed to an email account on the message server, message server 410 sends the message to redirector appliance 415, redirector appliance 415 redirects notification of the message to remote message server 425 and remote message server 425 sends the notification to wireless user device 445. If the notification comprises an indication of a new message, the user of wireless user device 430 may communicate with message server 410, possibly using a secure protocol as SSL, to obtain the message content.

Still referring to FIG. 4, upon receiving a request to print an email message attachment from wireless user device 430, remote message server 425 sends the request to redirector appliance 415, redirector appliance 415 redirects the request to message server 410, message server 410 sends the attachment to printer 400 and printer 400 prints the attachment.

The examples presented in FIG. 4 are for purposes of illustration only and are not intended to be limiting in any way. Those of ordinary skill in the art will recognize that many types of messages may be redirected by redirector appliance 415 through a firewall 420 to a wireless user device 430. Those of ordinary skill in the art will also recognize that many types of requests sent by a wireless user device 445 may be received by redirector appliance 440 and redirected.

Figure 5:
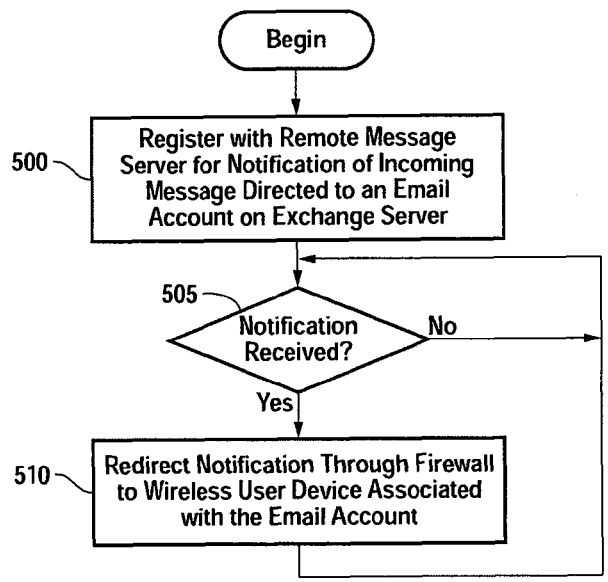
FIG. 5 is a flow diagram that illustrates a method for redirecting a notification to a wireless user device by registering with an exchange server in accordance with one embodiment of the present invention.

Turning now to FIG. 5, a flow diagram that illustrates a method for redirecting a notification to a wireless user device by registering with an exchange server in accordance with one embodiment of the present invention is presented. At 500, a redirector registers with an exchange server for notifications of incoming email messages directed to an email account on the exchange server. At 505, a determination is made regarding whether a notification of incoming email messages has been received. If a notification of incoming email messages has been received, at 510 the notification is redirected to the wireless user device associated with the email account.

Figure 6:
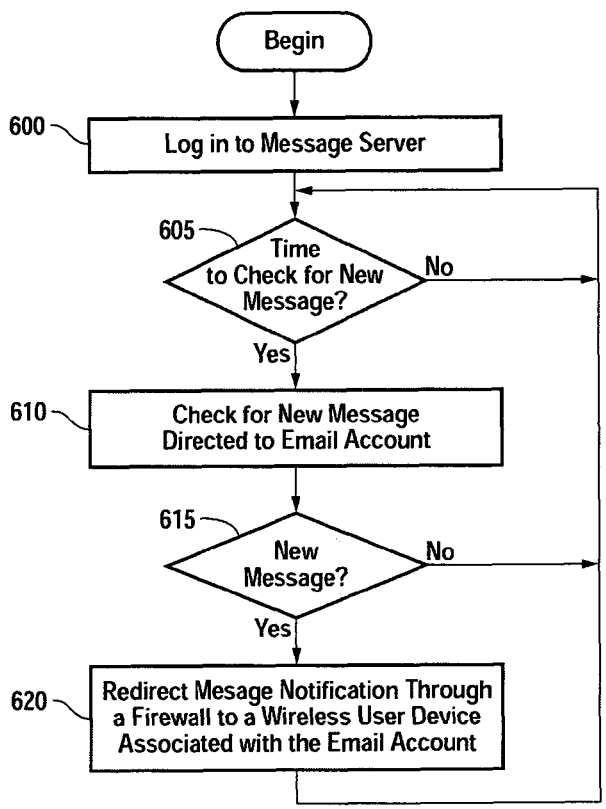
FIG. 6 is a flow diagram that illustrates a method for redirecting a notification to a wireless user device by polling an email server in accordance with one embodiment of the present invention.

Turning now to FIG. 6, a flow diagram that illustrates a method for redirecting a notification to a wireless user device by polling an email server in accordance with one embodiment of the present invention is presented. At 600, a redirector logs in to an email server. At 605, a determination is made regarding whether it is time to check for email messages directed to an email account associated with a user. If it is time to check for new email messages, the check is performed at 610. At 615, a determination is made regarding whether there is at least one new email message. If there is at least one new email message, the at least one email message is retrieved at 620 and at 625 the at least one email message is redirected to the wireless user device associated with the email account.

The above description regarding message monitoring protocols and message distribution protocols is for the purpose of illustration and is not intended to be limiting in any way. Those of ordinary skill in the art will recognize other communication protocols may be used.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method for redirecting a notification towards a wireless user device, the method comprising:

registering for notification of incoming messages for an account on a message server, the incoming messages directed towards an account on the message server, the message server in communication with a network protected by a firewall;

by a redirector appliance having a memory and a network switch configured to interface between the appliance, a remote desktop computer and the network, receiving at least one notification; and by the redirector appliance, redirecting the at least one notification through the firewall, towards a wireless user device associated with the account.

2. The method of claim 1 wherein
the message server comprises an email server; and
the at least one new message comprises at least one new email.

3. The method of claim 2 wherein
the message server comprises an exchange server; and
the method further comprises using a message monitoring protocol to obtain the at least one notification.

4. The method of claim 1 wherein the at least one notification comprises at least one message.

5. The method of claim 4, further comprising encrypting the at least one message before the redirecting.

6. The method of claim 1 wherein the at least one notification comprises at least one indication of at least one message.

7. The method of claim 1 wherein the redirecting further comprises using SMS (Short Message Service) as a transport protocol to deliver the at least one notification to the wireless user device.

8. A computer implemented method for redirecting a notification towards a wireless user device, the method comprising:
by a redirector appliance having a memory and a network switch configured to interface between the appliance, a remote desktop computer and a network protected by a firewall, periodically checking for receipt, by the redirector appliance, of at least one new message directed towards an account on the message server, the message server in communication with the network; and
by the redirector appliance, redirecting a notification of the at least one new message through the firewall, towards a wireless user device associated with the account.

9. The method of claim 8 wherein
the message server comprises an email server; and
the at least one new message comprises at least one new email.

10. The method of claim 9 wherein the method further comprises using a message distribution protocol to obtain the at least one notification.

11. The method of claim 8 wherein the at least one notification comprises at least one message.

12. The method of claim 11, further comprising encrypting the at least one message before the redirecting.

13. The method of claim 8 wherein the at least one notification comprises at least one indication of at least one message.

14. The method of claim 8 wherein the redirecting further comprises using SMS (Short Message Service) as a transport protocol to deliver the at least one notification to the wireless user device.

15. A computer implemented method for redirecting a notification towards a wireless user device, the method comprising:
step for registering for notification of incoming messages for an account on a message server, the incoming messages directed towards an account on the message server, the message server in communication with a network protected by a firewall;
step for, by a redirector appliance having a memory and a network switch configured to interface between the appliance, a remote desktop computer and the network, receiving at least one notification; and
step for, by the redirector appliance, redirecting the at least one notification through the firewall, towards a wireless user device associated with the account.

16. The method of claim 15 wherein
the message server comprises an email server; and
the at least one new message comprises at least one new email.

17. The method of claim 16 wherein the message server comprises an exchange server; and
the method further comprises step for using a message monitoring protocol to obtain the at least one notification.

18. The method of claim 15 wherein the at least one notification comprises at least one message.

19. The method of claim 18, further comprising step for encrypting the at least one message before the redirecting.

20. The method of claim 15 wherein the at least one notification comprises at least one indication of at least one message.

21. The method of claim 15 wherein the step for redirecting further comprises step for using SMS (Short Message Service) as a transport protocol to deliver the at least one notification to the wireless user device.

22. A computer implemented method for redirecting a notification towards a wireless user device, the method comprising:
step for, by a redirector appliance having a memory and a network switch configured to interface between the appliance, a remote desktop computer and a network protected by a firewall, periodically checking for receipt, by the redirector appliance, of at least one new message directed towards an account on the message server, the message server in communication with the network; and
step for, by the redirector appliance, redirecting a notification of the at least one new message through the firewall, towards a wireless user device associated with the account.

23. The method of claim 22 wherein
the message server comprises an email server; and
the at least one new message comprises at least one new email.

24. The method of claim 23 wherein the method further comprises step for using a message distribution protocol to obtain the at least one notification.

25. The method of claim 22 wherein the at least one notification comprises at least one message.

26. The method of claim 25, further comprising step for encrypting the at least one message before the redirecting.

27. The method of claim 22 wherein the at least one notification comprises at least one indication of at least one message.

28. The method of claim 22 wherein the step for redirecting further comprises step for using SMS (Short Message Service) as a transport protocol to deliver the at least one notification to the wireless user device.

29. A program storage device readable by a machine, embodying a program of instructions executable by the machine to perform a method for redirecting a notification towards a wireless user device, the method comprising:
registering for notification of incoming messages for an account on a message server, the incoming messages directed towards an account on the message server, the message server in communication with a network protected by a firewall;
by a redirector appliance having a memory and a network switch configured to interface between the appliance, a remote desktop computer and the network, receiving at least one notification; and by the redirector appliance, redirecting the at least one notification through the firewall, towards a wireless user device associated with the account.

30. The program storage device of claim 29 wherein
the message server comprises an email server; and
the at least one new message comprises at least one new email.

31. The program storage device of claim 30 wherein
the message server comprises an exchange server; and
the method further comprises using a message monitoring protocol to obtain the at least one notification.

32. The program storage device of claim 29 wherein the at least one notification comprises at least one message.

33. The program storage device of claim 32, the method further comprising encrypting the at least one message before the redirecting.

34. The program storage device of claim 29 wherein the at least one notification comprises at least one indication of at least one message.

35. The program storage device of claim 29 wherein the redirecting further comprises using SMS (Short Message Service) as a transport protocol to deliver the at least one notification to the wireless user device.

36. A program storage device readable by a machine, embodying a program of instructions executable by the machine to perform a method for redirecting a notification towards a wireless user device, the method comprising:
by a redirector appliance having a memory and a network switch configured to interface between the appliance, a remote desktop computer and a network protected by a firewall, periodically checking for receipt, by the redirector appliance, of at least one new message directed towards an account on the message server, the message server in communication with the network; and
by the redirector appliance, redirecting a notification of the at least one new message through the firewall, towards a wireless user device associated with the account.

37. The program storage device of claim 36 wherein
the message server comprises an email server; and
the at least one new message comprises at least one new email.

38. The program storage device of claim 37 wherein the method further comprises using a message distribution protocol to obtain the at least one notification.

39. The program storage device of claim 36 wherein the at least one notification comprises at least one message.

40. The program storage device of claim 39, the method further comprising encrypting the at least one message before the redirecting.

41. The program storage device of claim 36 wherein the at least one notification comprises at least one indication of at least one message.

42. The program storage device of claim 36 wherein the redirecting further comprises using SMS (Short Message Service) as a transport protocol to deliver the at least one notification to the wireless user device.

43. An apparatus for redirecting a notification towards a wireless user device, the appliance comprising:
means for registering for notification of incoming messages for an account on a message server, the incoming messages directed towards an account on the message server, the message server in communication with a network protected by a firewall;
means for, by the redirector appliance having a memory and a network switch configured to interface between the appliance, a remote desktop computer and the network, receiving at least one notification; and
means for, by the redirector appliance, redirecting the at least one notification through the firewall, towards a wireless user device associated with the account.

44. The redirector appliance of claim 43 wherein
the message server comprises an email server; and
the at least one new message comprises at least one new email.

45. The redirector appliance of claim 44 wherein
the message server comprises an exchange server; and
the apparatus further comprises means for using a message monitoring protocol to obtain the at least one notification.

46. The redirector appliance of claim 43 wherein the at least one notification comprises at least one message.

47. The redirector appliance of claim 46, further comprising means for encrypting the at least one message before the redirecting.

48. The redirector appliance of claim 43 wherein the at least one notification comprises at least one indication of at least one message.

49. The redirector appliance of claim 43 wherein the means for redirecting further comprises means for using SMS (Short Message Service) as a transport protocol to deliver the at least one notification to the wireless user device.

50. The redirector appliance of claim 43, further comprising means for receiving means for receiving the wireless user device.

51. A redirector appliance for redirecting a notification towards a wireless user device, the appliance comprising:
means for logging in to a message server;
means for, by the redirector appliance having a memory and a network switch configured to interface between the appliance, a remote desktop computer and a network protected by a firewall, periodically checking for receipt, by the redirector appliance, of at least one new message directed towards an account on the message server, the message server in communication with the network; and
means for, by the redirector appliance, redirecting a notification of the at least one new message through the firewall, towards a wireless user device associated with the account.

52. The redirector appliance of claim 51 wherein
the message server comprises an email server; and
the at least one new message comprises at least one new email.

53. The redirector appliance of claim 52 wherein the apparatus further comprises means for using a message distribution protocol to obtain the at least one notification.

54. The redirector appliance of claim 51 wherein the at least one notification comprises at least one message.

55. The redirector appliance of claim 54, further comprising means for encrypting the at least one message before the redirecting.

56. The redirector appliance of claim 51 wherein the at least one notification comprises at least one indication of at least one message.

57. The redirector appliance of claim 51 wherein the redirecting further comprises means for using SMS (Short Message Service) as a transport protocol to deliver the at least one notification to the wireless user device.

58. The redirector appliance of claim 51, further comprising means for receiving the wireless user device.

\* \* \* \* \*